United States Patent [19]
Brant et al.

[11] Patent Number: 5,805,787
[45] Date of Patent: *Sep. 8, 1998

[54] DISK BASED DISK CACHE INTERFACING SYSTEM AND METHOD

[75] Inventors: William A. Brant, Boulder; Michael Edward Nielson, Broomfield, both of Colo.

[73] Assignee: EMC Corporation, Hopkinton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 578,161

[22] Filed: Dec. 29, 1995

[51] Int. Cl.$^6$ .................................................. G06F 11/00
[52] U.S. Cl. ...................... 395/182.04; 711/114; 711/113; 711/134; 711/136
[58] Field of Search ............................. 395/182.04, 440, 395/441, 439, 438, 484, 845, 878, 446, 182.03, 182.06, 182.07; 360/98.04, 98.05, 98.06; 369/178, 191, 221; 711/112, 113, 114, 118, 128, 136, 133

[56] References Cited

U.S. PATENT DOCUMENTS

| | | | |
|---|---|---|---|
| 4,430,701 | 2/1984 | Christian et al. | 364/200 |
| 4,593,354 | 6/1986 | Ushiro | 364/200 |
| 4,723,223 | 2/1988 | Hanada | 364/900 |
| 4,791,642 | 12/1988 | Taylor et al. | 371/38 |
| 4,870,565 | 9/1989 | Yamamoto et al. | 364/200 |
| 4,920,539 | 4/1990 | Albonesi | 371/40.2 |
| 4,958,351 | 9/1990 | Flora et al. | 371/40.1 |
| 4,995,041 | 2/1991 | Hetherington et al. | 371/40.1 |
| 5,058,116 | 10/1991 | Chao et al. | 371/40.2 |
| 5,109,502 | 4/1992 | Sasamoto et al. | 395/425 |
| 5,142,627 | 8/1992 | Elliot et al. | 395/825 |
| 5,148,432 | 9/1992 | Gordon et al. | 364/200 |
| 5,185,876 | 2/1993 | Nguyen et al. | 395/425 |
| 5,208,813 | 5/1993 | Stallmo | 364/268.5 |
| 5,235,601 | 8/1993 | Stallmo et al. | 371/40.1 |
| 5,274,799 | 12/1993 | Brant et al. | 395/425 |
| 5,345,575 | 9/1994 | English et al. | 395/425 |
| 5,390,187 | 2/1995 | Stallmo | 364/268.5 |
| 5,398,253 | 3/1995 | Gordon | 395/182.04 |
| 5,432,922 | 7/1995 | Polyzois et al. | 395/425 |
| 5,469,566 | 11/1995 | Hohenstein et al. | 395/182.04 |
| 5,484,598 | 1/1996 | Kashima et al. | 395/182.04 |
| 5,499,377 | 3/1996 | Gordon . | |
| 5,511,177 | 4/1996 | Kagimasa et al. | 395/182.04 |
| 5,535,418 | 7/1996 | Suzuki | 395/845 |
| 5,548,711 | 8/1996 | Brant et al. | 395/182.03 |
| 5,550,801 | 8/1996 | Enomoto et al. | 369/178 |
| 5,553,307 | 9/1996 | Fujii et al. | 395/845 |
| 5,561,825 | 10/1996 | Yamagami et al. | 395/878 |
| 5,568,628 | 10/1996 | Satoh et al. | 395/440 |

FOREIGN PATENT DOCUMENTS

| | | | |
|---|---|---|---|
| 0416968A2 | 8/1990 | European Pat. Off. | G06F 11/20 |
| WO89909468 | 10/1989 | WIPO | G11B 20/18 |

OTHER PUBLICATIONS

Ludescher et al., "File Storage Management for TFTR Physics Data", IEEE Fusion Engineering, 14th Symposium, pp. 856–859, 1992.

Oriji et al., "Write–Only Disk Cache Experiments on Multiple Surface Disks", Computing and Information, 1992 International Conference, pp. 385–388.

Gray, J., Horst, B., and Walker, M.; Parity Striping and Disc Arrays: Low–Cost Reliable Storage with Acceptable Throughput (Jan. 1990).

Ousterhout, J., and Douglis, F., Beating the I/O Bottleneck: A Case for Log–Structured File Systems (Aug. 4, 1988).

*Primary Examiner*—Joseph Palys
*Attorney, Agent, or Firm*—John R. Wahl; William J. Kubida; Holland & Hart LLP

[57] ABSTRACT

Large numbers of relatively small (e.g., 1.8" or smaller) off-the-shelf disk drives are controlled to maximize the highest throughput performance at the least cost between a host computer and a mass storage subsystem. Host data is stored redundantly so as to form a cache. The controller recognizes data contained in its associated disk cache so as to produce that data to a requesting host with minimum delay. Data not in the disk cache as well as write commands are transferred to the controller of a mass storage subsystem with no substantial delay.

17 Claims, 3 Drawing Sheets

DISK BASED DISK CACHE INTERFACING SYSTEM AND METHOD

CROSS-REFERENCE TO RELATED APPLICATIONS

Commonly-assigned U.S. patent applications Ser. No. 08/561,337, filed Nov. 21, 1995 entitled "Improved Fault Tolerant Controller System and Method" by W. A. Brant, M. E. Nielson an G. Howard; Ser. No. 08/363,132 entitled "A Fault Tolerant Memory System" by G. Neben, W. A. Brant and M. E. Nielson; and Ser. No. 08/363,655 entitled "Method and Apparatus for Fault Tolerant Fast Writes Through Buffer Dumping" by W. A. Brant, G. Neben, M. E. Nielson and D. C. Stallmo (a continuation-in-part application of U.S. Ser. No. 08/112,791 by Brant and Stallmo which is itself a continuation-in-part of application Ser. No. 638,167 filed Jan. 6, 1991 by Brant, Stallmo, Walker and Lui the latter of which is now U.S. Pat. No. 5,274,799) describe fault tolerant data processing apparatus and processes which interface between hosts and data storing subsystems.

BACKGROUND OF THE INVENTION

1. Field of the Invention

The present invention relates to data processing structures and procedures which provide interfacing between computer type systems and low cost but slow performing mass data storage devices or subsystems. More particularly, the present invention relates to digital data handling structures and methods which optimize cost/performance interfacing between host systems which exchange data with relatively inexpensive high capacity data storage devices. While not necessarily so limited, the present invention is especially useful in systems having a dynamic ability to overcome errors resulting from various sources during transmission of digital data between computer oriented complexes.

2. Description of the Related Art

The costs of manufacturing disk drives as a media for storing digital data has reduced dramatically in recent years. It has far outpaced the cost reductions associated with solid state and other data storage devices. Smaller form factor disk drives permit disk subsystems to exploit the performance advantages of having more disk drives to service requests in parallel.

The components of disk subsystems have also become significantly more reliable in recent years. Mean Time Between Failure (MTBF) ratings have progressed from 15,000 hours in 1988 to 500,000–800,000 hours for both disk drives and power supplies. The MTBF for controller electronics continues to improve with integration and lower power requirements.

The personal computer (PC) technology has become ever more popular for use as major elements in data processing and handling systems and subsystems. System configurations known as RAID (Redundant Array of Inexpensive Disks) computers have likewise evolved.

Caching controllers that interface with host computers or the like for directing data exchanges with large arrays of magnetic data storing disks, or other storage media, have developed for providing a storage medium for large quantities of digital information. These controllers respond to read and write commands from a remote computer system to receive, and/or deliver data over interconnecting busses. They often employ expensive solid state storage, such as RAM, to cache host data to minimize the relatively long latency of the disk subsystem.

Preferably, the caching controller should function so that it minimizes delays and demands on the host system, while including the ability to recover wherever possible from errors from single points of failure. System configurations and operations capable of dynamically overcoming single points of failure are sometimes referred to as fault tolerant systems. The aforementioned related patent applications describe such redundant fault tolerant systems and operations in a disk array controller environment.

It is known to improve storage system reliability by redundant recordings of the same data on duplicate tape or disk drive systems. This allows improved reliability in that the data is still available from the back-up recording in the event of failure of the primary drive. Furthermore, the redundancy helps to somewhat reduce the amount of time required to read that data in that the controller can issue concurrent read commands to both of the redundant storage devices. The data is selected from the drive which first produces it.

The cache controller avoids wait time by the host computer, or central processor, in reading or writing relative to a disk by buffering write data into a protected fast memory, and servicing most read data from fast memory. A system, as described in the cross-referenced copending patent application, can include redundant storage media array controllers for responding to host computer requests for transferring data between that host computer and an arrangement for low cost but large quantity data storage.

In "Computer Architecture, A Quantitative Approach" by D. A. Patterson and J. L. Hennessey (Morgan Kaufmann Publishers, Inc., Second Edition, 1990, 1996), discusses processor memory, or RAM, and how it is cached. It describes the disciplines, such as direct map, set associative, and the like.

SUMMARY OF THE INVENTION

The present invention advantageously utilizes an array of relatively slow devices, such as low cost disk drives, with the data replicated across those devices so as to enhance the probability that one of the read/write heads is relatively close to the desired data upon the occurrence of a read command. The controller renders a logical decision as to which drive can produce the desired data with the least delay.

The present invention deliberately uses mapping and caching techniques to replicate data across a multiplicity of disk drives to substantially enhance the ability to quickly recover the data. The data is replicated across the drives, and replications of the data on the same drive is likewise possible, thereby minimizing the time for a read/write head to encounter the desired data. Thus, inexpensive storage improves the speed of data recovery.

The controller optimizes the seek and rotational latency times. A given controller can concurrently service a plurality of data recovery operations. The mere presence of a particular data exchange request as from the host is not necessarily the next item that will receive execution. The controller determines which service requests are queued ahead of a given request, and further projects where each of the read/write heads of the disk drives will reside at that time. Thus, the controller can determine which disk drive head will actually recover the requested data well in advance of its actually producing that result.

A series of products based on a single hardware package further leverages the value of using contemporary, off-the-shelf components. A disk based disk cache, a high performance simplex and/or duplex mirrored disk subsystem, and a low maintenance mass storage unit using RAID5 are possible. RAID3 configurations can be configured with hardware accelerators.

The most economical disk drives have found continuing favor in high volume applications, such as PCs and workstations. Leveraging the cost performance of these disk drives into high read/write performance applications requires packaging large numbers of disks coupled with a controller to manage the complexity of distributing data among all the drives, and the use of data parity codes and data striping to mitigate the decreased MTBF.

As disk drives become smaller, the performance advantages of using very large numbers of disks becomes feasible since space requirements are small, and power and control distribution is over small distances. As the cost per megabyte (MB) falls, it becomes less expensive to increase disk subsystem performance by storing the data on multiple drives instead of using expensive controllers that distribute and reconstruct data with parity, such as in RAIDS systems.

With regard to disk based disk cache management strategies, the mechanical characteristics and the size of the disk based disk cache suggest special constraints for managing the disk based disk cache that would not apply to conventional caching mechanisms. Different management strategies will have varying impact on complexity/performance measures.

The core technologies of fault tolerant subsystem design and high transaction processing capabilities support new architectures and platforms to create product differentiation through performance. High performance subsystems have commanded, and will continue to command, higher margins than those based on contemporary features and capacity. Like other performance driven manufacturers of all products, low end commodity machines follow the high performance flagship product.

The subsystem in accordance with this invention exploits the cost and high reliability characteristics of high volume, widely available small form factor disks drives and standard processor platforms. The system incorporates components of such high reliability or sufficient spares such that hot pluggable Customer Replaceable Units (CRU's) are not necessary to ensure adequate service life. The present invention is well suited to advantageously utilize the 1.8" (or smaller) disk drives, as well as IBM PC, Mips PC, or Dec Alpha PC compatible motherboards. It can employ purchased multitasking operating systems and standard power supplies.

The advantages of this approach are manifold. These include exploitation of contemporary core technologies (not mere implementations), dual controller/fault tolerant storage subsystems, environmental/configuration sense and control, controllers based on PC technology, development tools that are numerous, cheap, and sophisticated, volumes and competition which jointly keep the cost per MIP very low, third party development of faster controllers, third party interface hardware and driver software availability, and third party operating systems.

The present invention is concerned with controllers that execute data exchanges between requesting host computers, and one or more satellite data storage units associated with that controller. The present invention can accommodate implementation in conjunction with a caching disk array controller in a fault tolerant disk array subsystem.

A controller in which one feature of the present invention is useful has a plurality of elements arranged to receive data exchange controlling commands from a remote computer. These commands are utilized in conjunction with a fast memory to buffer data accompanying such commands between the computer and at least one satellite data storage unit, such as an array of disk drives. The memory controller includes a subset of elements whose primary purpose is for retrieving data from the fast memory for transfer to an output terminal.

Apparatus in accordance with this invention provides interfacing between a host data processing device and a subsystem for storing large quantities of data. A controller is coupled for exchanging data and commands with the host, and with the subsystem. A plurality of low cost disks are coupled to this controller. The controller responds to commands from the host to read data from an address in the subsystem by inspecting the contents of the array of low cost disks to identify the presence of data corresponding to the address from the host. The controller transfers the data from the host specified data address from the disk to the host if the data is found to reside there.

This controller can also function upon a failure to find data in the disk array corresponding to the host specified address by recovering the data from the subsystem for both transfer to the host and storage in a plurality of disks in the array. The controller can also sense the disk having its read/write head closest to the requested data by the host for producing that data from the sensed disk.

The controller can further determine the time required for accommodating any previously occurring operations with the disk array before determining which disk has its said head closest to the data associated with a given read request from the host.

The method of this invention utilizes a plurality of low cost disks for interfacing between a host data processing device and a subsystem capable of storing large quantities of data. This method includes the step of receiving data exchanging commands from the host, and responding to commands from the host to read data from an address in the subsystem by inspecting the contents of the disks in the array. This inspection is to determine whether the data corresponding to the address is present in at least one of the disks.

Data from the specified address is transferred from one of the disks to the host in response to a favorable result from the inspecting step. Conversely, a failure to produce a positive result from the inspecting step results in the steps of recovering the data from the subsystem, transferring that recovered data to the requesting host, and storing that recovered data in a plurality of disks in the array.

Once presence of the specified data on the disks of the array is determined, the disk having its read/write head closest to that data requested by the host is selected, and the data is produced to the host from the selected disk. If necessary, the method of this invention includes the step of determining the time required for accommodating any previously occurring operations with the disks prior to performing the disk selecting step.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

The storage hierarchy associated with the various contemporary storage configurations appears as follows in order of highest cost but fastest performance first and lowest cost but slowest performance last:

1. The registers of a Microprocessor;
2. An on-chip cache;
3. An off-chip cache;
4. Main memory;
5. I/O buffers;
6. A solid state disk cache;
7. A disk based disk cache;
8. A high performance disk;
9. A high capacity disk;
10. Slower high capacity disks; and
11. Optical, tape and/or library.

A storage subsystem that has the MB cost of disk coupled with the performance of many disks operated in parallel can fill several intermediate slots in this hierarchy. Spin synchronizing of the disks can help keep disk access times relatively low. Further down the hierarchy, inexpensive controllers coupled to an array in RAID1 configurations can yield high I/O rates.

Still further down the hierarchy, RAID5 configurations reduce the cost of protected storage with small redundancy groups and higher capacity disk (more data under each disk head). Even higher capacity, but slower, configurations of protected data can be built with high capacity drives and large redundancy groups; i.e., 35+1. All these products can be based on a common purchased hardware platform and contemporary developed ASIC based daughter cards. RAID3 is supported with daughter cards with flow through parity generators.

Figure 1:
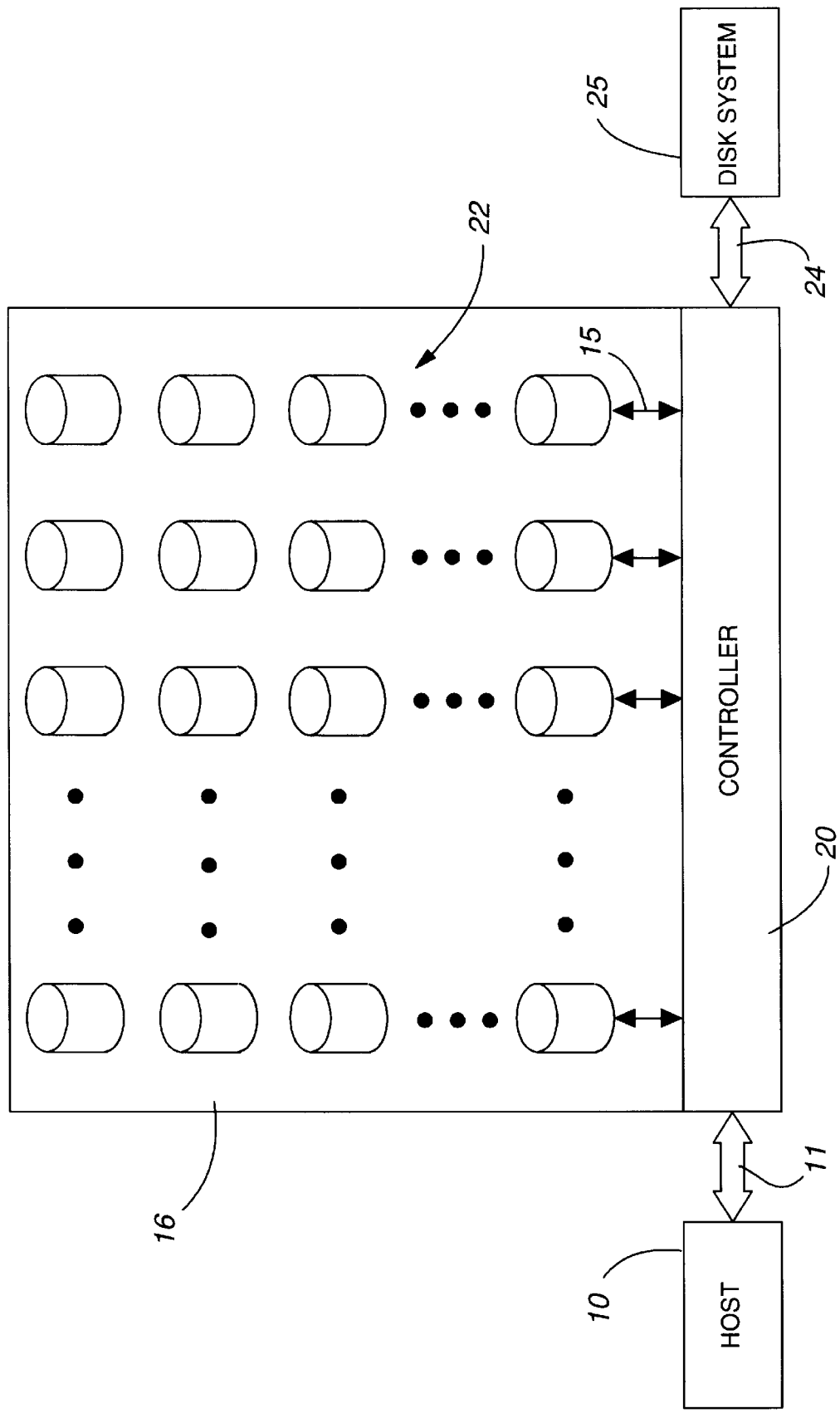
FIG. 1 is a system block diagram of a disk based disk array coupled to perform interfacing between a host and a mass data storage subsystem in accordance with the present invention.

The preferred embodiments of the present invention are herein described in the environment of a data processing system, including at least one remote host computer, such as host 10 in FIG. 1. Host 10 is in a relatively remote location with regard to disk subsystems responsive to interface exchanging local controller 20. Host 10 is in bidirectional communication with controller 20 of a disk based disk cache subsystem 16 via link 11.

Controller 20 employs its own buffer to interface with a separate disk based disk cache array 22 via bidirectional connections, such as connector 15. Fully redundant data paths interconnect the host with the controllers, as well as between the controllers. Controller 20 can include independent paths to write data to its memory in a mirrored fashion so that data is protected against loss.

Figure 2:
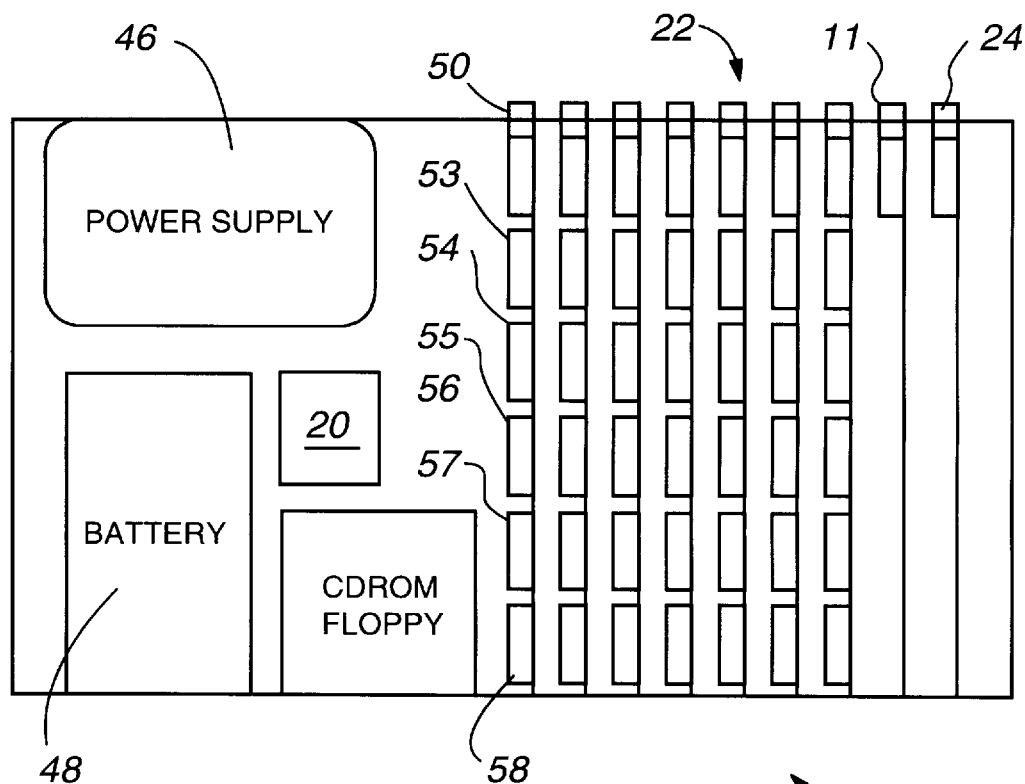
FIG. 2 shows a typical circuit board module configuration implementing the present invention.

FIGS. 1 and 2 illustrate the use of a plurality of disk drives 22 with FIG. 2 presenting the physical top view of a board implemented in accordance with the present invention. Floppy disk drive 45 is included for introducing programs into the controllers and storage units of board 40. Power supply 46 renders board 40 self-contained, while battery 48 provides temporary back-up power for board 40. The controller 20 module includes a processor chip with its associated high speed registers and buffer memory.

The system shown in FIG. 1 is an improvement over either directly coupling host 10 to the high volume data storage subsystem 25, or using a solid state type device, such as caching through use of a RAM for such interfacing. As to the former situation, the improvement is in that it significantly offloads the host computer from dedicated disk management tasks. With regard to the latter, the high cost of solid state interfacing devices is significantly avoided by a large margin, while providing an acceptable compromise in approximating the operating speed thereof.

Figure 3:
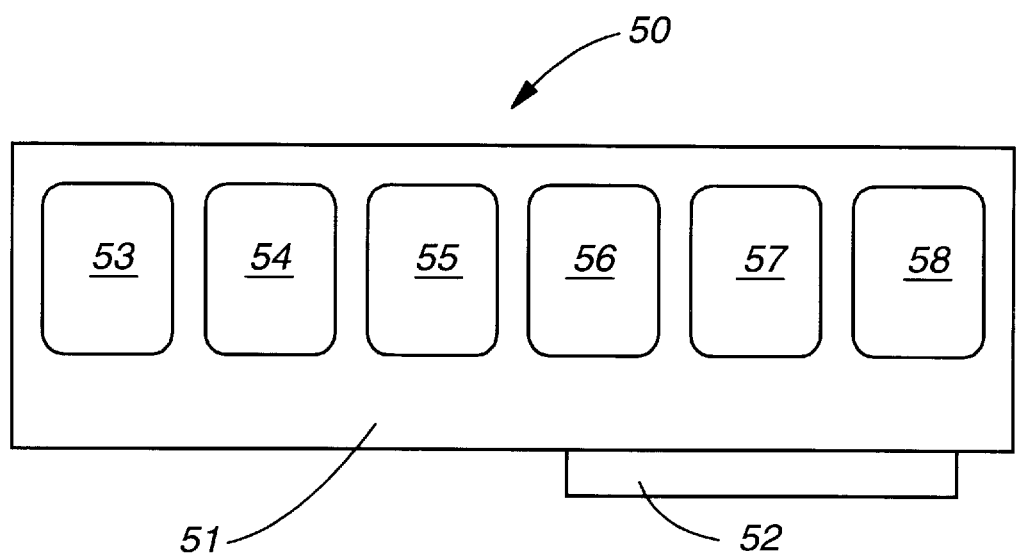
FIG. 3 is a physical depiction of a typical disk mounting board suitable for attachment to a motherboard shown in FIG. 2.

Array 22 as shown in FIG. 2 includes a printed circuit (PC) board 50. The base 51 of board 50 is attached to motherboard 40 via connector 52 shown in FIG. 3. Six small disk drives 53–58 (1.8-inch disk drives, for example) are attached to base 51 of PC board 50. The host interface 11 and the interface 24 to the mass data storage subsystem are likewise connected as boards to motherboard 50.

Figure 4:
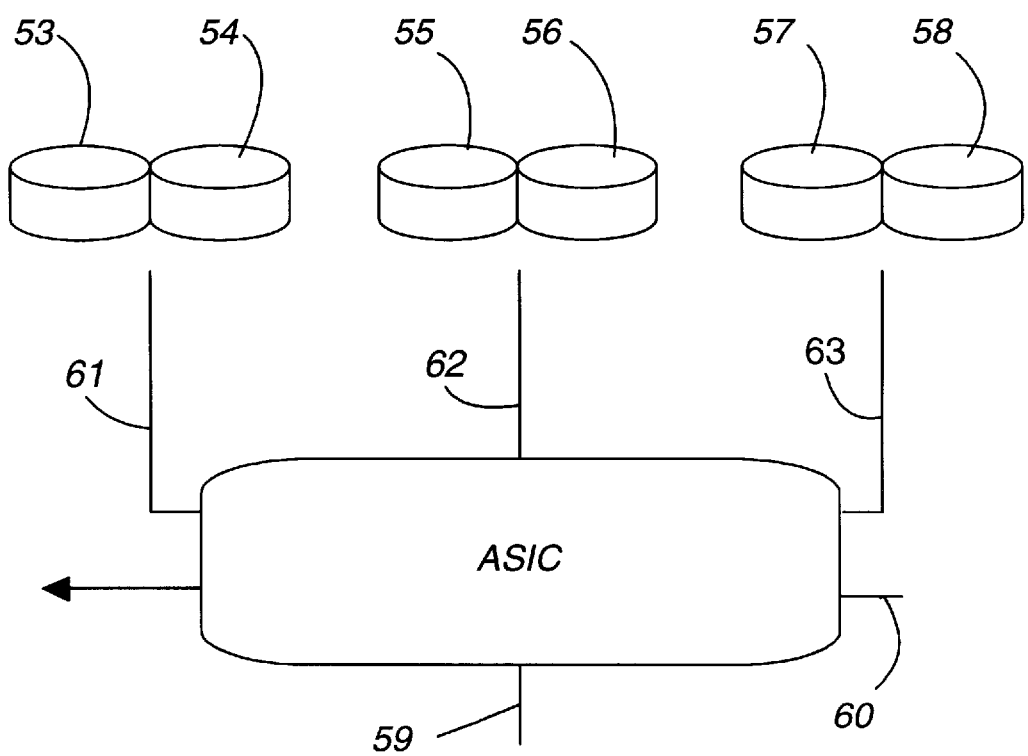
FIG. 4 is block diagram of a logical depiction of the disk subsystem in accordance with the present invention.

FIG. 4 presents the logical diagram of the disc drives 53–58 which communicate in pairs through standard disk drive interfaces 61, 62 and 63. The IDE standard for a PC-style disk drive interface handles pairs of drives, and could suffice for interfaces 61–63. Thus, disks 53–58 are the disks of the disk based disc cache interfacing system, while the other disks shown in array 22 might actually provide the disk storage devices for disk subsystem 25 possibly under the supervision of another controller (not shown). Conversely, an entirely separate high capacity data storage device can independently provide the subsystem 25 functions.

Internal data bus 59 can take the form of EISA, VESA or PCI types of standard disk drive interfaces. Application Specific Integrated Circuit (ASIC) 60 functions in response to commanding signals from the controller 20 to accomplish actual data exchanges with disks 53–58. ASIC 60 is substantially subservient to controller 20 to address the disk drives for storing or retrieving data.

Accordingly, host 10 interfaces with the disk based disk cache on board 40. Small Computer System Interface (SCSI) type connections are well suited for host interface 11, as well as interface 24. Both commands and data to and from the host computers 10 are handled via connections 11, all of which can occur concurrently. Through local busses, local processor 20 strips host 10 originated command signals from the interfaces to direct the operation of its fast memory elements and disk array 22 in handling the data associated with those commands.

Controller 20 determines the allocation of low cost disk array 22 in transferring data across interface 24 for storage in low cost (but low speed) disk subsystem 25. Typically, subsystem 25 includes its own controller to handle data exchanges coordinated with controller 20. A typical board is shown in FIG. 2 wherein interfacing modules 11 and 24 are coupled to cooperate with controller 20. Array 22 is made of a multiplicity of small disk drives which can encompass both the disk cache array 50 and, if desired, the disks of mass storage system 25 in FIG. 1.

A variety of possible disk based disk cache management strategies are possible. The mechanical characteristics and the size of the disk based disk cache suggest special constraints for managing the disk based disk cache that would not apply to conventional caching mechanisms. Different management strategies will have varying impact on complexity/performance measures. The following outlines several strategies potentially available for application in managing disk based cache systems.

A direct mapped strategy uses a simple function, such as a modulo operation, to map logical blocks to a physical location. A direct mapped strategy always writes a specific logical block to the same physical location. Therefore, the search entails a constant time segment.

A typical direct mapped write operation writes N copies of the data to the disk based disk cache comprised of N disks with one copy to each disk. In fault tolerant systems, the host may be signalled that the write operation is complete as soon as two of the N writes are completed. The logical write operation need not wait for the completion of all physical operations.

Unlike write operations, direct mapped read operations only need to access one device within the disk based disk cache. Therefore, the cache management strategy should select the device which can most quickly access the data. The factors that affect device access time are seek and rotational latency of each candidate drive, and the time necessary to complete previously queued operations for that drive. The cache management strategy minimizes device queuing by selecting the device which can most quickly access the data. Device rotational synchronization can minimize device latency. Devices are preferably synchronized so that the rotation of each device is offset by 1/N (where N is the number of devices in the system).

In direct mapping, the drives of array 22 can be considered to represent a linear set of logical data storage addresses with each sector stacked on top of the other. If, for example, there are twenty drives, each with twenty addressable sectors, there are four-hundred addressable sectors. The access time for all those sectors is not the same. It depends upon the rotational latency and the seek latency of each individual drive with regard to the actual location of the read/write head.

The number of bytes of data retainable by array 22 is markedly smaller than subsystem 25 can store. Direct map is a relatively simple algorithm. A certain number of bits describe the address of data in store 25, but it is possible to ignore the top of the address as this identifies the location of that byte in storage array 22. For instance, if store 22 has 65,000 locations with sixteen bits of address while store 25 has 4 gigabytes located in thirty-two address bits, a byte in store 22 shares addresses with 65K locations of store 25. Store 22 is selected to have enough capacity to hold the most important data that is used frequently by host 10. Data which becomes unimportant is replaced by some other data that has acquired importance in the system operation.

Host 10 specifies a particular address associated with the subsystem 25 storage. The lower segment of the address is used by a straightforward algorithm that allows the controller 20 to map into the disk cache. When host 10 requests a read operation from a thirty-two bit address, the disk cache controller 20 looks at the lower sixteen bits. Controller 20 retrieves the byte in conjunction with a tag or page frame number which completes identification of the location address with respect to the storage in subsystem 25.

Controller 20 recognizes that a match of the upper sixteen address bits represents data contained at the address specified by the lower sixteen bits. Controller 20 thus recognizes that the data is in the cache memory 50, and therefore can produce that data to host 10 with minimum delay. A failure to match means that access to storage subsystem 25 is needed. However, the retrieved data is stored in cache 50, and also transferred to host 10.

In the exemplary embodiment herein described, the disk 53–58 array on board 50 is designated as the disk based disk cache. On a write operation specified by host 10, the data is passed through to subsystem 25 for storage. The data is likewise placed in a cache 50 location at the location specified by the lower sixteen-bits of the address from host 10. The controller 20 might place the data on all of the drives associated with cache 50. A subsequent request for a read of that same data by host 10 results in controller 20 determining where the request resides in the queue of operations, and which read/write head of one of the drives on board 50 is closest to that data. Controller 20 knows where each disk of the cache is in its rotation.

Three operations involve time in association with an I/O function. The first relates to the wait in a queue of other I/O operation requests ahead of the request under consideration. The next time increment is the latency time which stems from the time it takes a read/write head to acquire an appropriate position over the data. The final time increment is the transfer time associated with acquisition of the data from the disk, and actual transfer to the requesting host or other device. The queuing and latency times are minimized by the processor of controller 20.

In operation, the processor of controller 20 in accordance with the present invention responds to a read request from host 10 by inspecting the contents of its associated disk cache. If the address of the requested data fails to match the disk cache stored data, a decision is made to pass the data read request directly through to the mass data storage device 25. The data acquisition is accomplished with substantially the same time increment as would occur if host 10 were directly coupled to storage subsystem 25.

However, when a match does occur, controller 20 recognizes that it is possible to retrieve that data from the cache storage, and return it to host 10 at a considerably faster rate than if the request were directly transferred to subsystem 25. The use of a plurality of low cost disk drives for the cache with common data stored thereon and the recognition of which disk has its read/write head closest to that data renders it possible to rapidly acquire and transfer the data to the requesting host 10.

Write commands from the host 10 are immediately recognized, and promptly passed to storage subsystem 25 without delay.

Another disk based disk cache management strategy is a set associative strategy. Set association uses a simple function (like a modulo operation) to map a logical block address to a table entry. Each table entry contains a fixed number of physical locations in which the logical block might be located. This approach helps alleviate thrashing that sometimes occurs for some workloads with a direct mapped strategy.

Multiple variations of set association are possible depending upon the eviction algorithm used to manage the table entries. For example, the logical data within the table entry can be evicted in a random, revolving, least recently used (LRU) or fastest fit algorithm. The optimum table entry management approach depends upon the cache workload.

A fully associative LRU cache management strategy allows any logical data block to be mapped to any physical location. With a true LRU, logical write operations evict the least recently used logical data block. Logical read operations use an index mechanism, such as a hash table, to find the physical location of the logical data. This approach favors cache workloads with a high locality of reference.

The fully associative, fastest fit cache management strategy evicts the closest possible physical location in order to optimize the write operation. Due to read operation interspersed between the write operations, logical write operations will cause each physical disk to evict different data.

Therefore, the fastest fit strategy is not a mirroring approach. Writes may be optimized at the expense of slower reads or even cache misses. Reads require an index mechanism, such as a hash table, to find the physical location of the logical data.

Another disk based disk cache management strategy is the fully associative, hybrid LRU/fastest fit strategy. Instead of evicting the least recently used data item, a hybrid system searches the N least recently used entries to find the fastest fit. The strategy offers some write performance without sacrificing cache effectiveness. The meta data required by this strategy is the same as the LRU strategy.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for interfacing between a host data processing device and a subsystem for storing large quantities of data comprising:

a controller coupled for exchanging data and commands with the host and with the subsystem;

a multidimensional array of disk drive storage devices coupled to said controller; and said controller including means for distributing multiple copies of data from said host to multiple locations on said array of disk drive storage devices utilizing a least recently used/fastest fit cache management strategy, and means responsive to commands from the host to read data from an address in the subsystem by inspecting the contents of said array of disks to identify the presence of data corresponding to said address, said controller further including means for transferring said address corresponding data from said array of disks to the host.

2. Apparatus in accordance with claim 1 wherein said controller further includes means operable upon a failure to find data in said array of disks corresponding to said address for recovering the data from the subsystem for both transfer to the host and storage in a plurality of said disks.

3. Apparatus in accordance with claim 1 wherein said controller includes means for sensing the disk in said array of disks having its read/write head closest to said data requested by the host.

4. Apparatus in accordance with claim 3 wherein said controller includes means for determining the time required for accommodating any previously occurring operations with said array of disks before determining which said disk has its said head closest to the data associated with a given read request from the host.

5. Apparatus for interfacing between a host data processing device and a subsystem capable of storing large quantities of data comprising:

a multidimensional array of low cost disks arranged as a disk based disk cache;

a controller including a programmed processor, said controller being coupled for exchanging data and commands with the host and with the subsystem wherein read commands from the host specify an address in the subsystem for identifying requested data;

means coupling said disk cache with said controller for operating said disks in response to output signals from said controller; and said controller including means for distributing multiple copies of data from said host to multiple locations on said array of disk drive storage devices utilizing a least recently used/fastest fit cache management strategy, and means responsive to host read data commands for inspecting the contents of said disks to determine whether the data corresponding to said address is present therein, said controller further including means responsive to a favorable result from said inspecting means for transferring said address corresponding data from said disk to the host.

6. Apparatus in accordance with claim 5 wherein said coupling means includes an ASIC module.

7. Apparatus in accordance with claim 5 wherein said disk cache includes a plurality of disk drives mounted on a circuit board.

8. Apparatus in accordance with claim 7 which includes a motherboard for receiving said disk drive circuit board and having said processor mounted thereon.

9. Apparatus in accordance with claim 8 which includes a disk drive for receiving separate disks mounted on said motherboard for selectively introducing programs to said processor.

10. Apparatus in accordance with claim 9 which includes a plurality of said disk drive circuit boards attached to said motherboard, said controller including means for designating which of the disk drives on said circuit boards function as the disk based disk cache.

11. Apparatus in accordance with claim 5 wherein said controller includes means responsive to a read command from the host for recovering data from the location in the subsystem corresponding to the said host specified address and for storing said data in a plurality of said disks of said disk based disk cache.

12. Apparatus in accordance with claim 11 wherein said controller includes means responsive to a favorable determination of the presence of requested data in said disk based disk cache for selecting the said disk of said cache which has its read head in closest proximity to said requested data.

13. Apparatus in accordance with claim 12 wherein said controller includes means for determining that said controller must process other functions before handling the host read command associated with the said disk selecting and further including means for determining the total time to handle all said other functions before selecting the said disk having its read head in closest proximity to said requested data.

14. The method of utilizing a multidimensional array of low cost disks for interfacing between a host data processing device and a subsystem capable of storing large quantities of data comprising the steps of:

storing multiple copies of data in multiple locations on said array of disk drive storage devices utilizing a least recently used/fastest fit cache management strategy;

receiving data exchanging commands from said host;

responding to commands from said host to read data from an address in the subsystem by inspecting the contents of said array of disks to determine whether the data corresponding to said address is present in at least one of said disks in said array; and transferring said address corresponding data from said disk to said host in response to a favorable result from said inspecting step.

15. The method in accordance with claim 14 which includes the steps of responding to a failure to produce a positive result from said inspecting step by recovering the data from the subsystem, transferring said recovered data to said host, and storing said recovered data in a plurality of said disks.

16. The method in accordance with claim 14 which includes the step of selecting the said disk having its read/write head closest to said data requested by the host, and producing to said host the data from said selected disk.

17. The method in accordance with claim 16 which includes the steps of determining the time required for accommodating any previously occurring operations with said disks prior to performing said selecting step.

* * * * *